Patented Mar. 20, 1934

1,951,861

UNITED STATES PATENT OFFICE 1,951,861

PROCESS OF WAX PURIFICATION

David Clarke Cox, Grand Rapids, Mich., assignor to Albert G. Dickinson, Grand Rapids, Mich.

No Drawing. Application October 13, 1930, Serial No. 488,553

3 Claims. (Cl. 196—13)

The present invention relates to a process for the purification by dissolving and settling out of a desired ingredient from a mixture of various ingredients in which the properties of the mixture are that it contains two or more substances, one or more of which is more soluble in a selected solvent than the remainder; the soluble portion must be of relatively low solubility below its melting point and of relatively high solubility above its melting point; the insoluble substances must differ appreciably in specific gravity from the solvent; and both portions must be meltable and in a melted condition at operating working temperature.

The process which I have discovered and brought by experiment to a high degree of success has been used in the extraction and purification of hydrocarbon waxes from the ore which contains wax in considerable proportions, mixed with which is considerable asphaltic matter and various impurities which occur in greater or less amounts in the ore commercially known as ozokerite. The hydrocarbon waxes are commercially known as ceresin and my invention in commercial use has been used in extracting ceresin wax from ozokerite ores, though in its broader sense, the invention is applicable for the extraction of one ingredient from a mixture of ingredients in which the properties of the ingredients in the mixture are as stated above.

A description of the invention with relation to the extraction of ceresin wax from ozokerite ores will be sufficient for an understanding of the invention and the principles which are involved therein.

In performing the process, the ozokerite ore is melted and agitated with a solvent consisting of one or more alcohols containing from three to five carbon atoms per molecule, and in practice the proportion of the solvent used is 80% of butyl alcohol and 20% diethyl carbinol. The proportions by weight of the ore to that of the solvent is one part of ore to seven of the solvent. The temperature at which the melted ore and solvent are brought together is found to be best at between 80 and 94 degrees centigrade.

In contacting the ore with said solvent the materials are agitated in any suitable manner either by boiling, blowing air therethrough, by stirring or any other mechanical means. Such agitation, together with the action of the solvent on the melted ore, causes a dissolving of the ceresin wax constituents in the solvent while the asphaltic matter is undissolved but it thoroughly impregnates the solution and is sustained therein in small globules forming an emulsion. The settling out of the small globules of asphaltic matter and of other impurities in the ore is not feasible by any ordinary means because of the extremely long time required.

With my invention the wax, dissolved in the solvent and with the thoroughly impregnated emulsion of asphaltic globules therein, is rapidly cooled in any suitable practical manner, whereupon the wax solidifies and separates from the solvent and precipitates and at the same time the free asphaltic material in emulsified form in the mixture is drawn from, gathered in by and cooled with the free precipitated wax.

The final step of the process is to heat the free wax and intermingled asphaltic material but without agitation which, if it occurred, would again cause an emulsion. Upon heating the wax again dissolves in the solvent and the asphaltic materials separate therefrom, leaving a clear solution of wax in said solvent separated from the asphaltic material which, because of its different specific gravity, readily separates. This solvent, with wax dissolved therein, may then be drawn from the tank or other receptacle in which the process has taken place, and the solvent distilled off leaving wax as the product produced from said process. It is also apparent that any solvent which is intermixed with the settled asphaltic material may also be readily distilled therefrom so as not to be lost.

The steps of dissolving in a heated solvent having a temperature above the melting point of wax constituent, and obtaining a rapid dissolving of the wax in the solvent by the combined action of heat and vigorous agitation, followed by cooling the solution to separate the wax from the solvent, the wax serving as an absorbent for the asphaltic material which is thus coagulated, then reheating but without agitation whereby the wax is redissolved, with a separation of the asphaltic materials, are the essential steps of the process. Other impurities in the ores, such as insoluble earthy materials and the like settle rapidly and do not thereafter interfere with the extraction of the wax. It is the coloring matter of which the prime constituent is asphaltic material in the ozokerite ores that have been extremely hard to remove through any process known other than those involving a very long time. With my process the time of extraction and purification is short and large quantity production of the hydrocarbon materials which make ceresin wax is possible.

The wax after production by this process may have to undergo a still further process for removing some hydrocarbon materials which are productive of oils at ordinary atmospheric temperatures rather than solids, and this is the subject matter of a separate application for patent filed by me on October 13, 1930, Serial No. 488,554; but such extraction of oils is not part of the present invention.

The process described produces a wax in which substantially all of the asphaltic materials or other materials which would color the wax to a dark shade are removed but a very small percentage of coloring materials left, not more than one-half of one percent of the mass, which may thereafter be removed by a decolorization process in accordance with well-known practice for such purposes. It is the reduction of the ozokerite ore to produce a wax product, known as undecolorized refined wax, and having approximately one-half of one percent asphaltic or other dark coloring materials incorporated therein which is produced by the process of my invention, decolorization for removing the approximately one-half percent of materials which impregnate and color the wax being readily performed when desired once the undiscolorized refined wax has been attained by the process of the present invention.

While the use of a solvent with little or no impurities therein has been described and is practical, it is not necessary that the solvent shall be of any exceptionally pure character and, in practice, the process may be carried on with the solution used from previous extractions, and which has some percentage of wax constituents therein as well as some asphaltic or some other dark or black materials carried therein, the action of the solvent upon the ore readily taking place under such conditions.

The temperatures at which the emulsified solution and mixture is cooled has been found best as between 55° and 77° C. These variations of temperature are dependent to a large extent upon the character of the ore and the rapidity at which the dissolving steps of the process are to take place. While my invention has been illustrated specifically by a description thereof in connection with the extraction of ceresin wax from ozokerite ores, it is evident, as previously stated, that the process is applicable to any mixture of compounds having the properties stated above and that the invention should not be limited to the purification of ozokerite ores alone for the production of ceresin waxes. The invention is defined in the appended claims and is to be considered as broadly comprehensive as the terms used in said claims to define the invention permit.

I claim:

1. The herein described process of treating ozokerite ores containing hydrocarbon wax constituents and asphaltic material, which consists in subjecting said ores to the action of a solvent at a temperature above the melting point of the wax and asphaltic constituents and simultaneously agitating the same whereby a solution of wax constituents in the solvent completely impregnated and emulsified by particles of asphaltic material is produced, rapidly cooling the same whereby the wax constituents separate from the solvent and carry the asphaltic material therewith, and then heating the mixture without agitation to again dissolve the wax constituents in the solvent with a separation out of the asphaltic matter.

2. The herein described process of obtaining hydrocarbon wax from ozokerite ores containing hydrocarbon wax constituents and asphaltic material, which consists in dissolving the ore in a solvent and agitating the same simultaneously with said solvent at a temperature above the melting point of the wax and asphaltic constituents, said solvent consisting of one or more alcohols containing from three to five carbon atoms per molecule, rapidly cooling the solution and asphaltic material therein, reheating the solution to again dissolve the wax constituents in the solvent whereupon the asphaltic matter separates therefrom, and then withdrawing the solvent and wax constituents in solution therein and distilling the solvent therefrom.

3. The herein described process of obtaining hydrocarbon wax from ozokerite ores containing hydrocarbon wax constituents and asphaltic material, which consists in contacting the ore with a solvent consisting of approximately 80% butyl alcohol and 20% diethyl carbinol, and agitating the same in said solvent at a temperature above the melting point of the wax and asphaltic constituents, rapidly cooling the solution and emulsion produced thereby, and then reheating the solution to again dissolve the wax constituents in the solvent, whereupon the asphaltic matter separates therefrom.

DAVID CLARKE COX.